(12) United States Patent
Woo et al.

(10) Patent No.: US 8,797,486 B2
(45) Date of Patent: Aug. 5, 2014

(54) DISPLAY PANEL COMPRISING A PIXEL ELECTRODE INCLUDING A MICRO-SLIT PATTERN AND A CONTROL ELECTRODE WHEREIN THE CONTROL ELECTRODE OVERLAPS AN ENTIRE PORTION OF THE PIXEL ELECTRODE IN A PLAN VIEW

(75) Inventors: Hwa-Sung Woo, Gyeonggi-do (KR); Hee-Seop Kim, Gyeonggi-do (KR)

(73) Assignee: Samsung Display Co., Ltd. (KR)

( * ) Notice: Subject to any disclaimer, the term of this patent is extended or adjusted under 35 U.S.C. 154(b) by 24 days.

(21) Appl. No.: 12/142,496

(22) Filed: Jun. 19, 2008

(65) Prior Publication Data

US 2009/0073367 A1 Mar. 19, 2009

(30) Foreign Application Priority Data

Sep. 13, 2007 (KR) ........................ 10-2007-0093122

(51) Int. Cl.
*G02F 1/1337* (2006.01)
*G02F 1/1343* (2006.01)
*G02F 1/136* (2006.01)

(52) U.S. Cl.
USPC .............................. 349/130; 349/142; 349/48

(58) Field of Classification Search
USPC ............................................ 349/48, 141, 130
See application file for complete search history.

(56) References Cited

U.S. PATENT DOCUMENTS

| | | | | |
|---|---|---|---|---|
| 4,740,782 A * | 4/1988 | Aoki et al. | ...................... | 345/92 |
| 6,407,791 B1 * | 6/2002 | Suzuki et al. | ................. | 349/129 |
| 2001/0005251 A1 * | 6/2001 | Kim et al. | ..................... | 349/141 |
| 2001/0048501 A1 * | 12/2001 | Kim et al. | ..................... | 349/141 |
| 2003/0107687 A1 * | 6/2003 | Choo et al. | ........................ | 349/39 |
| 2005/0041186 A1 * | 2/2005 | Shimoshikiryo | ............. | 349/129 |
| 2005/0046763 A1 * | 3/2005 | Ono et al. | ........................ | 349/39 |
| 2006/0152660 A1 * | 7/2006 | Tanaka et al. | ................. | 349/139 |
| 2006/0215098 A1 * | 9/2006 | Choi et al. | ..................... | 349/139 |
| 2006/0231838 A1 * | 10/2006 | Kim | ................................ | 257/59 |
| 2007/0052899 A1 * | 3/2007 | Lin et al. | ........................ | 349/141 |
| 2007/0132929 A1 * | 6/2007 | Kataoka et al. | ............... | 349/123 |
| 2007/0159586 A1 * | 7/2007 | Kim et al. | ...................... | 349/143 |
| 2007/0285608 A1 * | 12/2007 | Fan et al. | ....................... | 349/155 |
| 2008/0013027 A1 * | 1/2008 | Kawamura et al. | ........... | 349/143 |
| 2008/0122767 A1 * | 5/2008 | Lim et al. | ........................ | 345/87 |

FOREIGN PATENT DOCUMENTS

| | | |
|---|---|---|
| JP | 10-133209 A | 5/1998 |
| JP | 10-142577 A | 5/1998 |
| JP | 2001-249350 A | 9/2001 |
| JP | 2002-055343 A | 2/2002 |
| JP | 2003-149647 A | 5/2003 |
| JP | 2004-102209 A | 4/2004 |
| JP | 2004-258598 A | 9/2004 |
| JP | 2004-272259 A | 9/2004 |
| JP | 2005-519327 A | 6/2005 |
| KR | 1998-032940 | 7/1998 |
| KR | 1020010085598 | 9/2001 |
| KR | 1020030019080 | 3/2003 |
| WO | WO 2006049048 A1 * | 5/2006 |

* cited by examiner

*Primary Examiner* — Paul Lee

(74) *Attorney, Agent, or Firm* — Innovation Counsel LLP

(57) ABSTRACT

A liquid crystal display having enhanced transmittance in which the pixel electrode includes a micro-slit pattern and overlaps a control electrode on the insulation layer so that an effective voltage difference is formed between the pixel electrode and the control electrode to control the directional characteristics of the liquid crystal molecules.

23 Claims, 6 Drawing Sheets

DISPLAY PANEL COMPRISING A PIXEL ELECTRODE INCLUDING A MICRO-SLIT PATTERN AND A CONTROL ELECTRODE WHEREIN THE CONTROL ELECTRODE OVERLAPS AN ENTIRE PORTION OF THE PIXEL ELECTRODE IN A PLAN VIEW

CROSS-REFERENCE TO RELATED APPLICATIONS

This application claims priority under 35 U.S.C. §119 to Korean Patent Application No. 2007-93122, filed on Sep. 13, 2007 in the Korean Intellectual Property Office (KIPO), the contents of which are herein incorporated by reference in their entirety.

BACKGROUND OF THE INVENTION

1. Field of the Invention

The present invention relates to a display and, more particularly, to a display device having a display panel including an array substrate exhibiting greater transmittance.

2. Description of the Related Art

Generally, an image displayed by a liquid crystal display (LCD) device suffers from distortion according to the angle from which the image is viewed. Such distortion can be overcome by employing patterned vertical alignment (PVA) in which the PVA LCD device has a patterned pixel electrode in a lower substrate and a patterned common electrode in an upper substrate. When an electric field is applied to a liquid crystal layer interposed between the lower substrate and the upper substrate, a fringe field is generated at an edge portion of the patterned pixel electrode and the patterned common electrode to align liquid crystal molecules along a plurality of directions.

Recently, a micro-slit structure of the PVA LCD device has been developed. In the micro-slit structure of the PVA LCD device, micro-slits are formed in the pixel electrode of the lower substrate and micro-slits are not formed in the common electrode of the upper substrate. The micro-slits are finely formed so as to increase the transmittance of the LCD device. However, the ability to finely form the micro-slits on the pixel electrode has limits from the standpoint of process technology.

SUMMARY OF THE INVENTION

The present invention provides a display device having an array substrate exhibiting enhanced transmittance.

In one aspect of the present invention, an array substrate includes a thin-film transistor (TFT) layer, a control electrode, an insulation layer, and a pixel electrode. The TFT layer includes a first switching element electrically connected to a gate line and a data line that cross each other. The control electrode is formed in a pixel area of the TFT layer. The insulation layer is formed on the control electrode. The pixel electrode includes a micro-slit pattern formed therein. The pixel electrode is overlapped with the control electrode on the insulation layer to be electrically connected to the first switching element.

In another aspect of the present invention, a display panel includes an array substrate and an opposite substrate. The array substrate includes a TFT layer, a control electrode, an insulation layer, and a pixel electrode. The TFT layer includes a first switching element electrically connected to a gate line and a data line that cross each other. The control electrode is formed in a pixel area of the TFT layer. The insulation layer is formed on the control electrode. The pixel electrode includes a micro-slit pattern formed therein. The pixel electrode is overlapped with the control electrode on the insulation layer to be electrically connected to the first switching element. The opposite substrate is coupled to the array substrate, and a liquid crystal layer is received between the opposite substrate and the array substrate. The opposite substrate includes a common electrode facing the pixel electrode.

According to an array substrate and a display panel having the array substrate, a pixel electrode having a micro-slit pattern formed thereon and a control electrode having an effective voltage difference are formed, so that direction characteristics of liquid crystal molecules may be controlled to enhance transmittance.

BRIEF DESCRIPTION OF THE DRAWINGS

The above and other advantages of the present invention will become readily apparent by reference to the following detailed description when considered in conjunction with the accompanying drawings, wherein.

DESCRIPTION OF THE EMBODIMENTS

Figure 1:
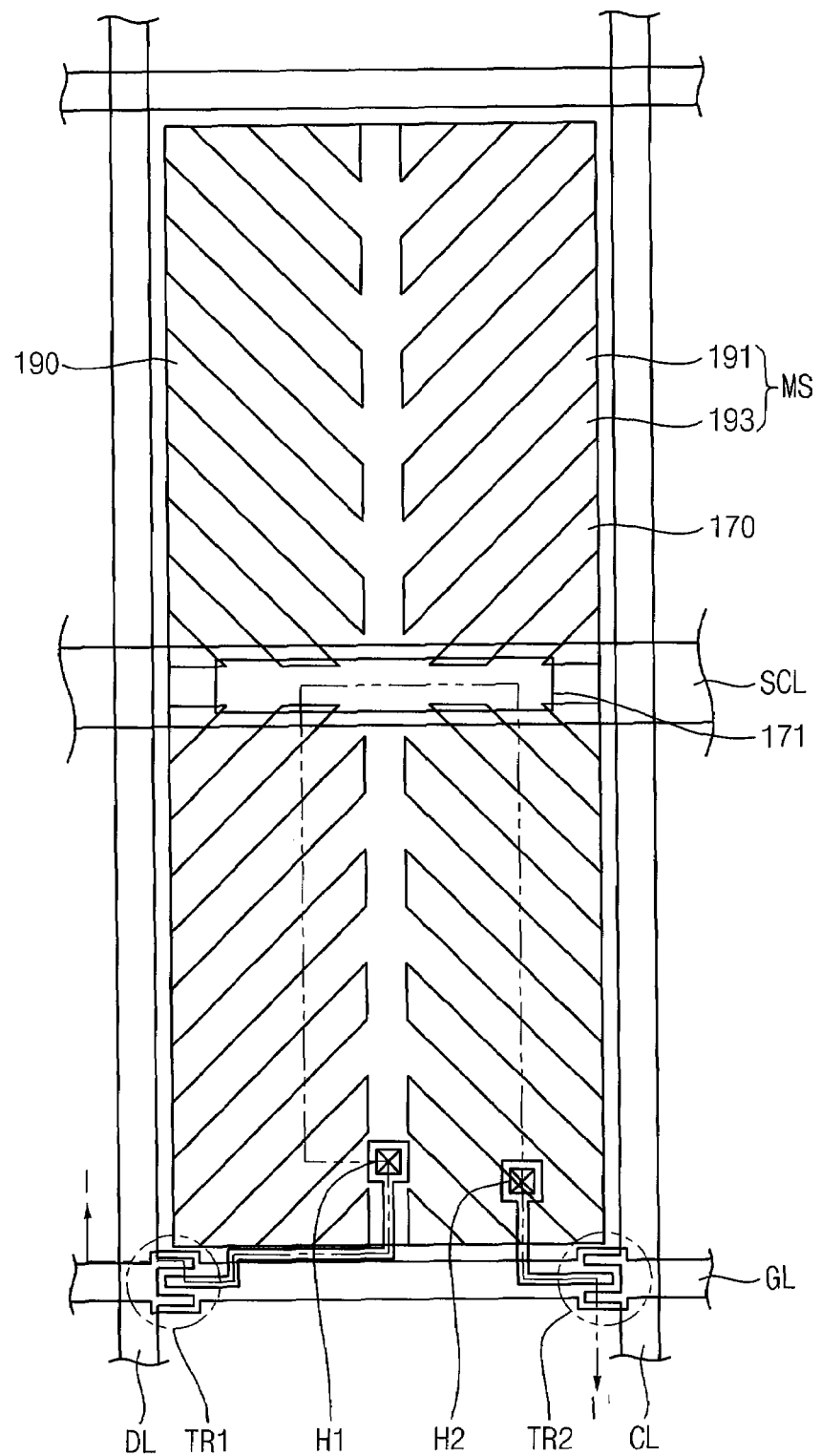
FIG. 1 is a plan view schematically illustrating a display panel according to an exemplary embodiment of the present invention.
Figure 2:
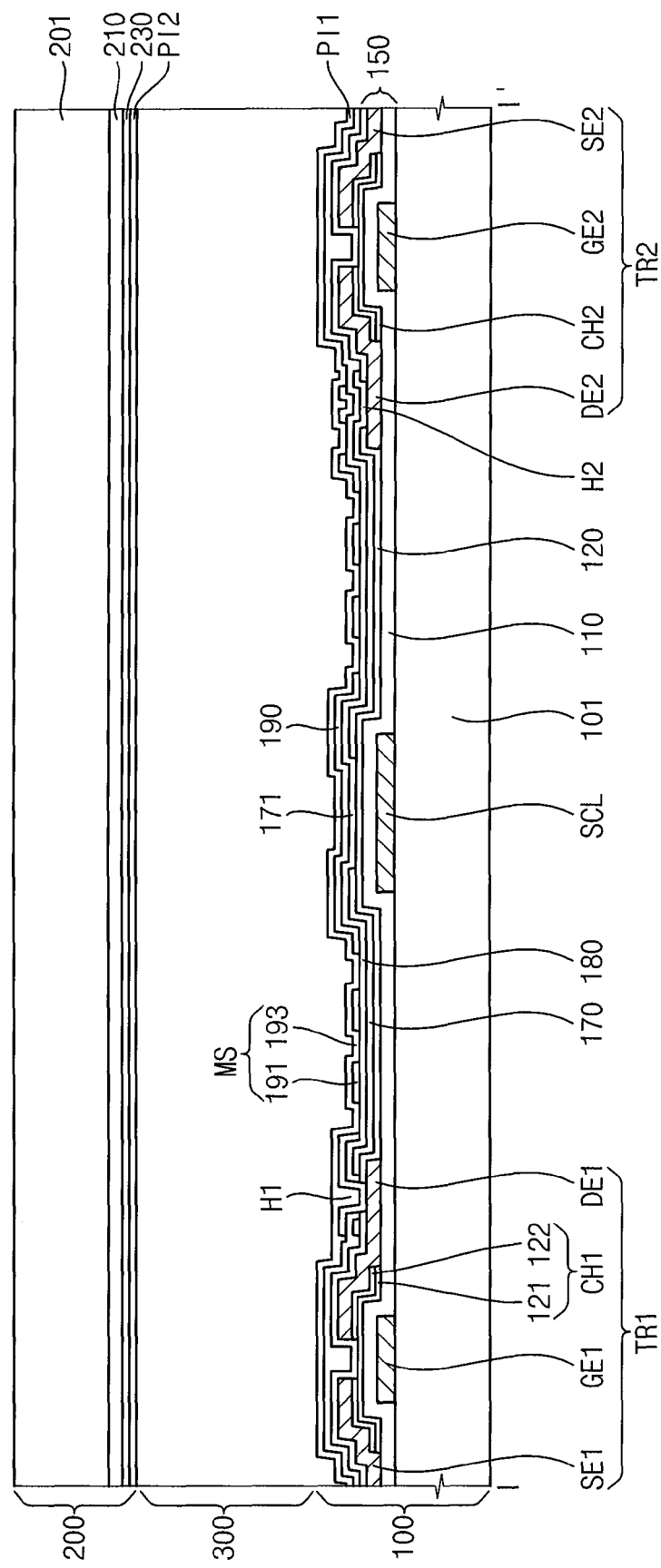
FIG. 2 is a cross-sectional view taken along a line I-I' of FIG. 1.

FIG. 1 is a plan view schematically illustrating a display panel according to an exemplary embodiment of the present invention. FIG. 2 is a cross-sectional view taken along a line I-I' of FIG. 1.

Referring to FIGS. 1 and 2, the display panel includes an array substrate 100, an opposite substrate 200, and a liquid crystal layer 300.

The array substrate 100 includes a first base substrate 101, a thin-film transistor (TFT) layer 150, a control electrode 170, an insulation layer 180, and a pixel electrode 190. The TFT layer 150, the control electrode 170, the insulation layer 180, and the pixel electrode 190 are formed on the first base substrate 101. The TFT layer 150 includes a gate line GL, a data line DL, a control line CL, a storage line SCL, a first switching element TR1 and a second switching element TR2.

For example, a gate metal pattern may be formed on the first base substrate 101. The gate metal pattern includes the gate and storage lines GL and SCL extending along a first direction, a first gate electrode GE1 of the first switching element TR1 electrically connected to the gate line GL, and a second gate electrode GE2 of the second switching element TR2 electrically connected to the gate line GL.

A gate insulation layer 110 is formed on the first base substrate 101 having the gate metal pattern formed thereon. A channel layer including a semiconductor layer 121 and an ohmic contact layer 122 is formed on the gate insulation layer 110. The channel layer includes a first channel portion CH1 of the first switching element TR1 and a second channel portion CH2 of a second switching element TR2.

A source metal pattern is formed on the channel layer. The source metal pattern includes the data line DL and a control line CL that are extended along a second direction crossing the first direction, a first source electrode SE1 of the first switching element TR1 connected to the data line DL, and a second source electrode SE2 of the second switching element TR2 connected to the control line CL. Moreover, the source metal pattern further includes a first drain electrode DE1 of the first switching element TR1 and a second drain electrode DE2 of the second switching element TR2.

A passivation layer 120 is formed on the first base substrate 101 having the source metal pattern formed thereon. The passivation layer 120 has a first hole H1 exposing the first drain electrode DE1 of the first switching element TR1, and a second hole H2 exposing the second drain electrode DE2 of the second switching element TR2.

A control electrode 170 is formed on the passivation layer 120, which includes an optically transparent and electrically conductive material. The control electrode 170 is formed in a pixel area corresponding to a unit pixel. The pixel area may have a rectangular shape as shown in FIG. 1. Alternatively, the pixel area may have other shapes such as a V-shape and so on.

The control electrode 170 is electrically connected to the second drain electrode DE2 of the second switching element TR2 through the second hole H2. The control electrode 170 may have an opening 171 in an area where the optically transparent and electrically conductive material is removed in correspondence with the storage line SCL. When the second switching element TR2 is turned on, the control electrode 170 receives a control voltage Vc that is transferred from the control line CL. The control voltage Vc is substantially lower than the data voltage Vd, and is substantially higher than a common voltage Vcom applied to a common electrode 230 of the opposite substrate 200.

An insulation layer 180 is formed on the control electrode 170. The insulation layer 180 may have a hole that is patterned in correspondence with the first hole H1.

A pixel electrode 190 is formed on the insulation layer 180, which includes the optically transparent and electrically conductive material. The pixel electrode 190 is electrically connected to the first drain electrode DE1 of the first switching element TR1 through the first hole H1. The size of the pixel electrode 190 may be substantially equal to that of the control electrode 170. Alternatively, the size of the pixel electrode 190 may be substantially smaller than that of the control electrode 170.

For example, the pixel electrode 190 may be formed in the pixel area. The size of the pixel electrode 190 may be substantially equal to that of a pixel area in the control electrode 170. Alternatively, the size of the pixel electrode 190 may be substantially smaller than that of the control electrode 170 in the pixel area. For example, when the pixel area has a rectangular shape, horizontal and vertical lengths of the pixel electrode 190 may be substantially equal to those of the control electrode 170, respectively. Alternatively, when the pixel area has a rectangular shape, horizontal and vertical lengths of the pixel electrode 190 may be substantially smaller than that of the control electrode 170, respectively.

The pixel electrode 190 may have a micro-slit pattern MS. The micro-slit pattern MS may include an electrode part 191 formed from the optically transparent and electrically conductive material, and an intermediate portion 193 exposing the insulation layer 180 between the electrode parts 191 adjacent to each other. The widths of the electrode part 191 and the intermediate portion 193 are about 2 μm to about 10 μm, respectively. For example, the width of the electrode part 191 may be substantially equal to that of the intermediate portion 193.

When the first switching element TR1 is turned on, the pixel electrode 190 receives a data voltage Vd transferred from the data line DL. An effective voltage difference ΔV between the data voltage Vd applied to the pixel electrode 190 and the control voltage Vc applied to the control electrode 170 may be set to be a predetermined voltage that is greater than 0 V.

Therefore, the effective voltage difference ΔV is generated between the electrode part 191 and the intermediate portion 193 of the micro-slit pattern MS, so that a direction of liquid crystal molecules may be controlled. Transmittance may be enhanced at a fringe portion of the micro-slit pattern MS, so that the total transmittance may be enhanced.

A first alignment film Pl1 is formed on the pixel electrode 190.

The opposite substrate 200 includes a second base substrate 201, a color filter layer 210 formed on the second base substrate 201, and a common electrode 230.

The color filter layer 210 is formed in correspondence with the pixel electrode 190. The common electrode 230 formed on the color filter layer 210 may include an optically transparent and electrically conductive material. The common electrode 230 is not patterned, and is formed on the second base substrate 201. The common electrode 230 may be planarized with a uniform thickness. A second alignment film PL1 is formed on the common electrode 230.

Figure 3A:
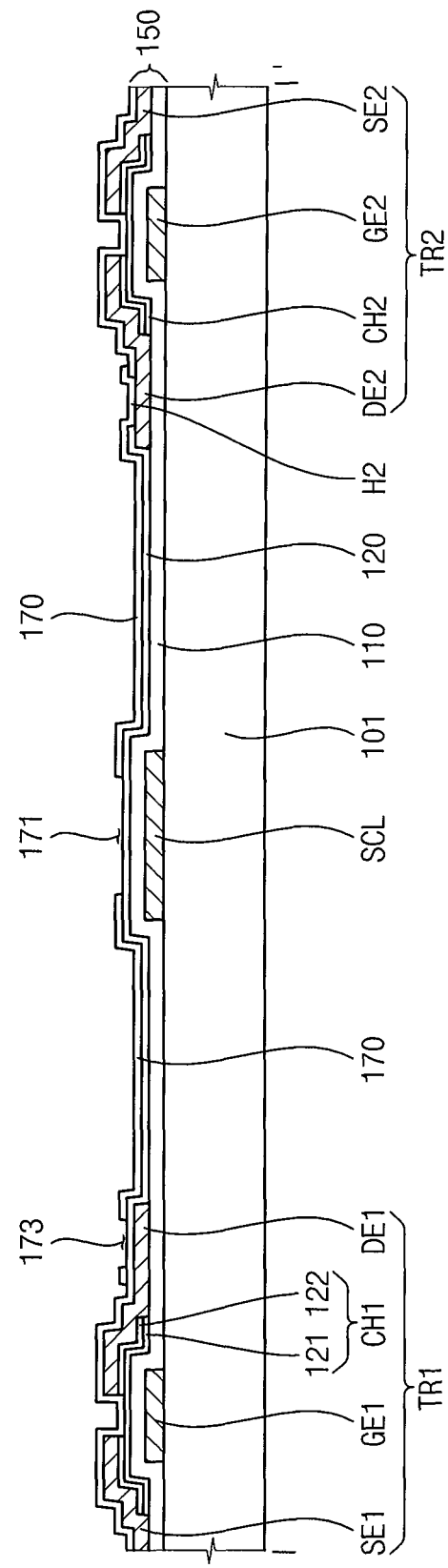
FIGS. 3A and 3B are cross-sectional views of an array substrate illustrating a manufacturing process of the array substrate of FIG. 2.
Figure 3B:
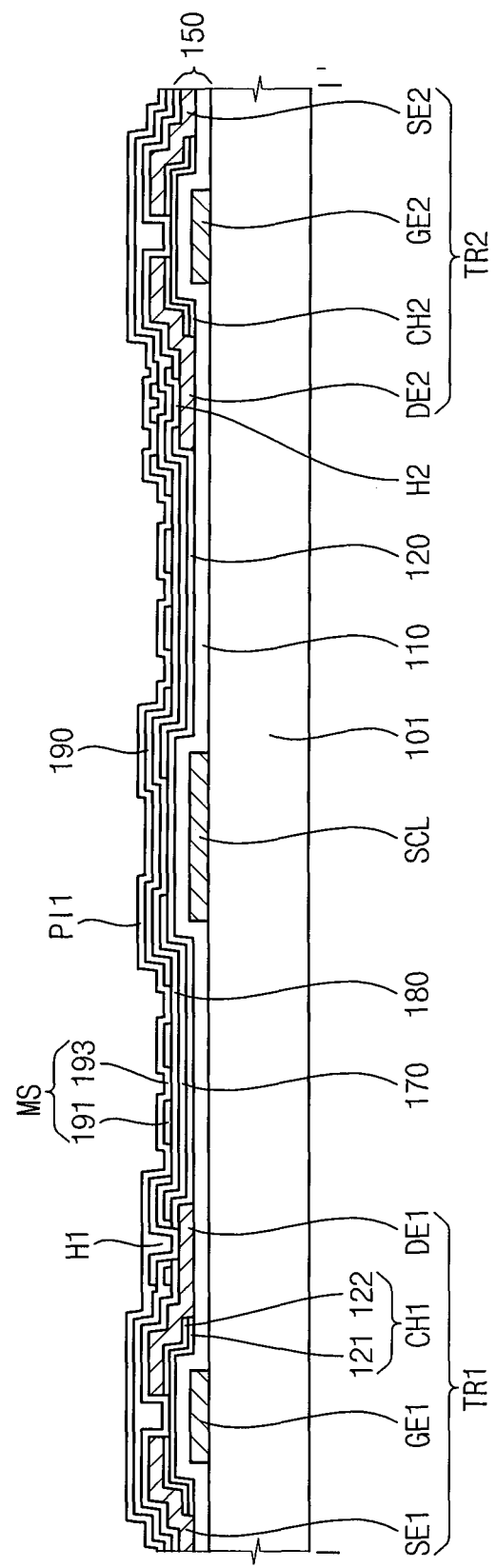

FIGS. 3A and 3B are cross-sectional views of an array substrate illustrating a manufacturing process of an array substrate of FIG. 2.

Referring to FIGS. 1 and 3A, a gate metal layer is deposited on the first base substrate 101, and the gate metal layer is patterned to form a gate metal pattern.

The gate metal pattern includes the gate and storage lines GL and SCL extending along the first direction, the first gate electrode GE1 of the first switching element TR1 electrically connected to the gate line GL, and the second gate electrode GE2 of the second switching element TR2 electrically connected to the gate line GL.

The gate insulation layer 110 is formed on the first base substrate 101 having the gate metal pattern formed thereon. The gate insulation layer 110 may include silicon nitride (SiNx) and silicon oxide (SiOx). The gate insulation layer 110 may be formed to a thickness of about 4,000 Å.

A semiconductor layer 121 including amorphous silicon (a-Si) and a channel layer including an ohmic contact layer 122 doped with n+ ions at a high concentration are formed on the first base substrate 101 having the gate insulation layer 110 formed thereon. The channel layer is patterned to form the first and second channel portions CH1 and CH2 on the gate insulation layer 110 having the first and second gate electrodes GE1 and GE2, respectively.

A source metal layer is deposited on the first base substrate 101 having the first and second channel portions CH1 and CH2 to form a source metal pattern. The source metal pattern includes the data line DL and a control line CL extending along a second direction crossing the first direction, a first source electrode SE1 of the first switching element TR1 connected to the data line DL, and a second source electrode SE2 of the second switching element TR2 connected to the control line CL. Moreover, the source metal pattern further includes a first drain electrode DE1 of the first switching element TR1 and a second drain electrode DE2 of the second switching element TR2.

A passivation layer 120 is formed on the first base substrate 101 having the source metal pattern formed thereon. The passivation layer 120 may include silicon nitride (SiNx). The passivation layer 120 may be formed to a thickness of about 2,000 Å. The passivation layer 120 is etched to form a second hole H2 exposing the second drain electrode DE2 of the second switching element TR2.

A TFT layer 150 is formed on the first base substrate 101 through the above manufacturing process.

An optically transparent and electrically conductive material is deposited on the first base substrate 101 having the TFT layer 150, and then the optically transparent and electrically conductive material is patterned to form the control electrode 170. The control electrode 170 includes an opening 171 formed in correspondence with the storage line SCL and a hole pattern 173 patterned in correspondence with the first drain electrode DE1.

The control electrode 170 makes contact with a second drain electrode DE2 through the second hole H2 to be electrically connected to the second switching element TR2. The control electrode 170 overlaps a portion of the storage line SCL, thereby defining a second storage capacitor CSTc. The second capacitor CSTc may charge predetermined charges in response to the control voltage Vc applied to the control electrode 170 and the common voltage Vcom applied to the storage line SCL.

Referring to FIGS. 1 and 3B, the insulation layer 180 is formed on the first base substrate 101 having the control electrode 170 formed thereon. The insulation layer 180 formed from an organic insulation material may be formed to a thickness of about 2,000 Å. The insulation layer 180 and the passivation layer 120 corresponding to the hole pattern 173 of the control electrode 170 are etched to form the first hole H1 exposing the first drain electrode DE1.

An optically transparent and electrically conductive material is deposited on the first base substrate 101 having the first hole H1 formed thereon, and then the optically transparent and electrically conductive material is patterned to form the pixel electrode 190. The pixel electrode 190 may have a micro-slit pattern MS. The micro-slit pattern MS may include an electrode part 191 (formed from the optically transparent and electrically conductive material), and an intermediate portion 193 exposing the insulation layer 180 between the electrode parts 191 adjacent to each other. The widths of the electrode part 191 and the intermediate portion 193 are about 2 μm to about 6 μm, respectively. For example, the width of the electrode part 191 may be substantially equal to that of the intermediate portion 193.

The pixel electrode 190 makes contact with the first drain electrode DE1 through the first hole H1 to be electrically connected to the first switching element TR1. The pixel electrode 190 makes contact with the passivation layer 120 through the opening 171 of the control electrode 170. Thus, a first storage capacitor CSTp may be defined between storage line SCL and the pixel electrode 190. The first storage capacitor CSTp may charge predetermined charges in response to the data voltage Vd applied to the pixel electrode 190 and the common voltage Vcom applied to the storage line SCL.

A first alignment film Pl1 is formed on the first base substrate 101 having the pixel electrode 190 formed thereon.

In an exemplary embodiment, in order to form the TFT layer 150, the gate metal layer, the channel layer, the source metal layer and the passivation layer are patterned through four masks. However, the TFT layer 150 may be formed through three masks. For example, when the three masks are used for forming the TFT layer 150, the channel layer and the source metal layer may be patterned through one mask.

Figure 4:
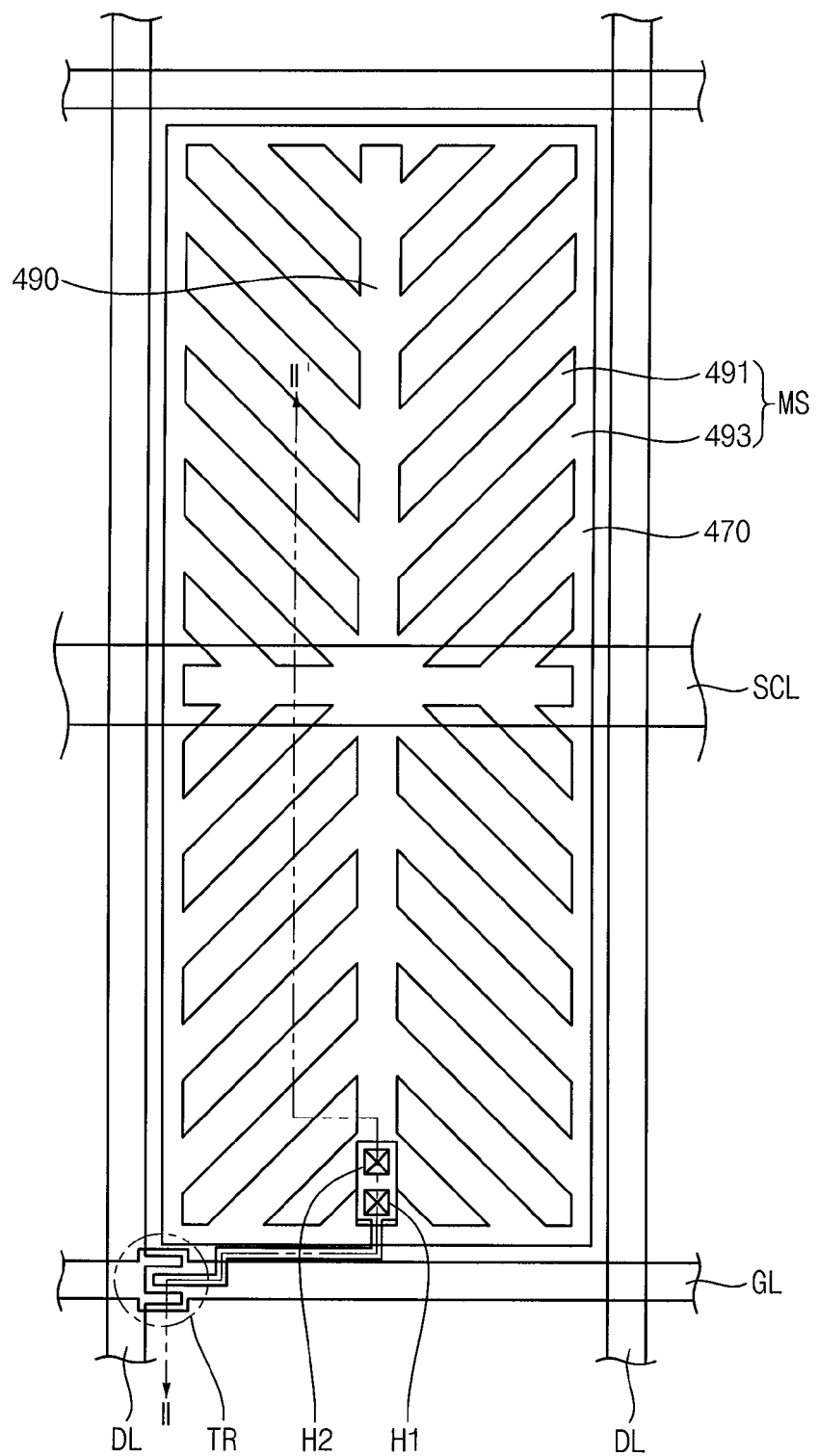
FIG. 4 is a plan view schematically illustrating a display panel according to another exemplary embodiment of the present invention.
Figure 5:
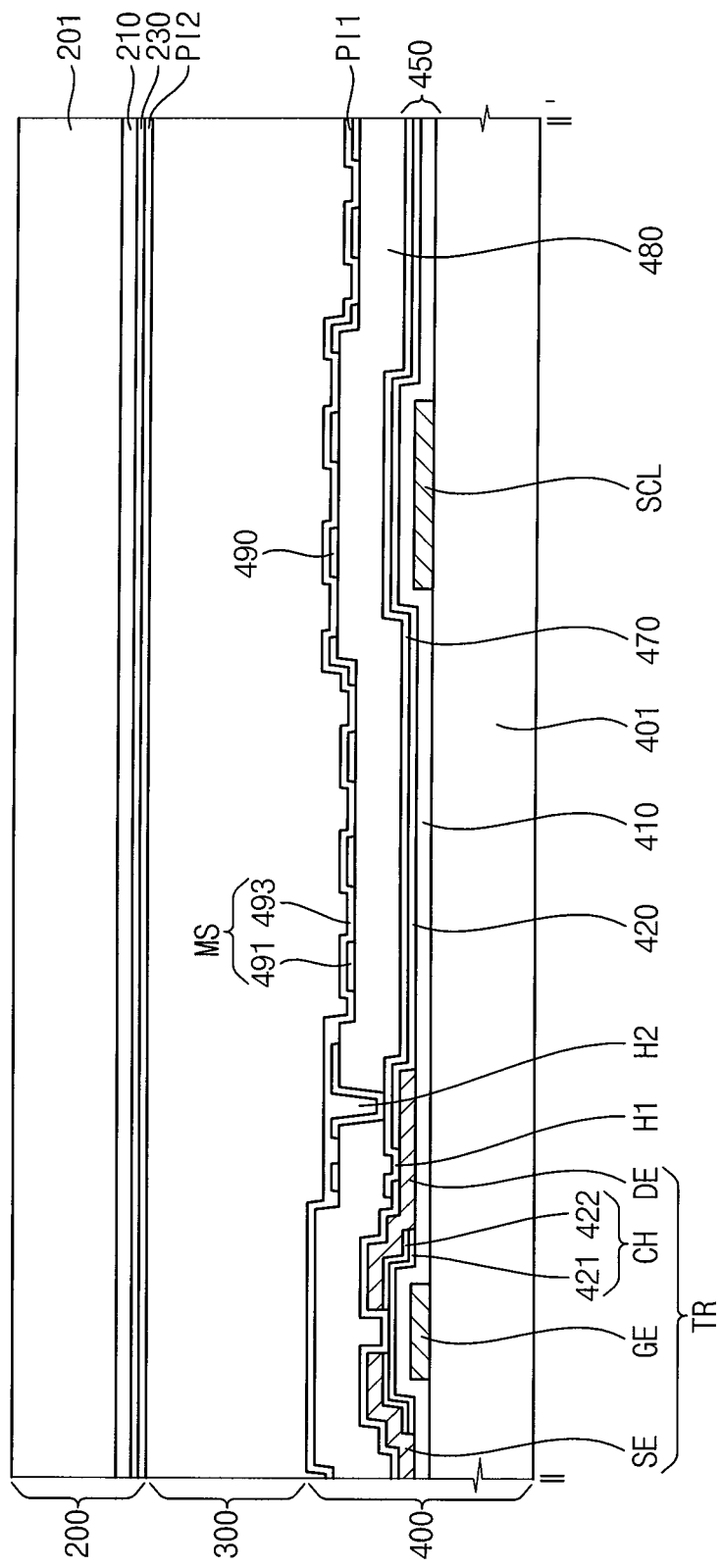
FIG. 5 is a cross-sectional view taken along a line II-II' of FIG. 4.

FIG. 4 is a plan view schematically illustrating a display panel according to another exemplary embodiment of the present invention. FIG. 5 is a cross-sectional view taken along a line II-II' of FIG. 4.

Referring to FIGS. 4 and 5, the display panel includes an array substrate 400, an opposite substrate 200 and a liquid crystal layer 300 interposed between the array substrate 400 and the opposite substrate 200. The display panel according to another exemplary embodiment is substantially the same as the display panel according to an exemplary embodiment as described in FIGS. 1 and 2 except for the array substrate 400. Thus, a detailed description thereof will be omitted and the array substrate 400 will be described.

The array substrate 400 includes a first base substrate 401, a TFT layer 450 formed on the first base substrate 401, a control electrode 470, an insulation layer 480 and a pixel electrode 490. The TFT layer 450 includes a gate line GL, a data line DL, a storage line SCL and a switching element TR.

A gate metal pattern is formed on the first base substrate 401. The gate metal pattern includes the gate line GL and storage line SCL extending along a first direction, and a gate electrode GE of the switching element T1 electrically connected to the gate line GL.

A gate insulation layer 410 is formed on the first base substrate 401 having the gate metal pattern formed thereon. A channel layer is formed on the gate insulation layer 410, which includes a semiconductor layer 421 and an ohmic contact layer 422. The channel layer includes a channel portion CH of the switching element TR.

A source metal pattern is formed on the channel layer. The source metal pattern includes the data line DL extended along a second direction crossing the first direction, a source electrode SE of the switching element TR electrically connected to the data line DL and a drain electrode DE spaced apart from the source electrode SE.

A passivation layer 420 is formed on the first base substrate 401 having the source metal pattern formed thereon. A first hole H1 is formed through the passivation layer 420, which exposes the drain electrode DE of the switching element TR.

A control electrode 470 is formed on the passivation layer 420, which includes an optically transparent and electrically conductive material. The control electrode 470 is electrically connected to the drain electrode DE of the switching element TR through the first hole H1. When the switching element TR is turned on, a data voltage Vd transferred from the data line DL is applied to the control electrode 470.

An insulation layer 480 is formed on the control electrode 470. A second hole H2 is formed through the insulation layer 480 exposing the control electrode 470.

A pixel electrode 490 is formed on the insulation layer 480, which includes the optically transparent and electrically conductive material. The pixel electrode 490 is electrically connected to the control electrode 470 through the second hole H2 to receive a voltage identical to the voltage applied to the control electrode 470. The insulation layer 480 is formed from an organic insulation material with a thickness of about 4 μm.

In the present exemplary embodiment, the pixel electrode 490 has a smaller size than the control electrode 470. Alternatively, the size of the pixel electrode 490 may be substantially equal to that of the control electrode 470. For example, the pixel electrode 490 may be formed in the pixel area. The pixel electrode 490 may be formed in the pixel area having the control electrode 470 formed thereon with a size substantially equal to that of the control electrode 470. The pixel electrode 490 may be formed in the pixel area having the control electrode 470 formed thereon with a size substantially smaller than that of the control electrode 470.

As described, when the pixel electrode 490 is formed to be substantially smaller than the control electrode 470, the pixel electrode 490 and the control electrode 470 may generate an effective voltage difference at an edge portion of the pixel electrode 490 to enhance transmittance at the edge portion of the pixel electrode 490.

The pixel electrode 490 includes a micro-slit pattern MS. The micro-slit pattern MS includes an intermediate portion 493 that exposes the insulation layer 480 between an electrode part 491 including the optically transparent and electrically conductive material and electrode parts 491 adjacent to the electrode part 491. The width of the electrode part 491 is substantially equal to that of the intermediate portion 493. The width of the electrode part 491 may be about 2 μm to about 6 μm.

A first alignment film Pl1 is formed on the pixel electrode 490.

When the switching element TR is turned on, a data voltage Vd transferred from the data line DL is applied to the pixel electrode 490.

When the switching element TR is turned on, the control electrode 470 and the pixel electrode 490 receive a data voltage Vd transferred from the data line DL. The voltage applied to the control electrode 470 is decreased with respect to the voltage applied to the pixel electrode 490 in accordance with the thickness of the insulation layer 480. That is, the control voltage Vc applied to the control electrode 470 is smaller than the data voltage Vd and is greater than a common voltage Vcom applied to the common electrode 230.

For example, when an input voltage Vinput is applied to the pixel electrode 490 and the control electrode 470, a first effective voltage Vdomain1 of the pixel electrode 490, which is applied to the liquid crystal layer 300, may be the input voltage Vinput, and a second effective voltage Vdomain2 of the control electrode 470, which is applied to the liquid crystal layer 300, may be defined by the following Equation 1.

$$V domain1 = Vinput \quad \text{[Equation 1]}$$
$$V domain2 = Vinput \times \left(\frac{\varepsilon_{OL} d_{LC}}{\varepsilon_{OL} d_{LC} + \varepsilon_{LC} d_{OL}}\right)$$

In equation 1, '$\varepsilon_{OL}$' represents the dielectric constant of the organic layer, '$d_{OL}$' represents the thickness of the organic layer, and '$\varepsilon_{LC}$' represents the dielectric constant of liquid crystal molecules, and '$d_{LC}$' represents the cell gap of the liquid crystal layer.

As described above, even though an identical data voltage is applied to the control electrode 470 and the pixel electrode 490, an effective voltage difference ΔV is generated in accordance with the thickness of the insulation layer 480. For example, the thickness of the insulation layer 480 is controlled, so that the effective voltage difference ΔV may be set to be greater than about 0 V. The effective voltage difference ΔV is generated between the electrode part 491 and the intermediate portion 493 of the micro-slit pattern MS, so that a direction of liquid crystal molecules is controlled. Thus, transmittance may be enhanced at a fringe portion of the micro-slit pattern and an edge portion of the pixel electrode 490, thereby enhancing the total transmittance of the display panel.

Hereinafter, a process in which transmittance according to the present invention may be enhanced will be described using various comparative exemplary embodiments and various exemplary embodiments.

In Comparative Example 1, the control electrode 170 and the insulation layer 180 were not formed in the display panel according to the first exemplary embodiment of the present invention as shown in FIG. 2. That is, the micro-slit pattern MS of about 4 μm was formed on the pixel electrode 190. In Comparative Example 2, in comparison to Comparative Example 1, the micro-slit pattern MS of about 5 μm was formed in the pixel electrode 190, and the other conditions were substantially the same as those of Comparative Example 1.

Example 1 corresponds to the display panel of the first exemplary embodiment (as shown in FIG. 2) of the present invention. In Example 1, the sizes of the control electrode 170 and the pixel electrode 190 were substantially equal to each other, the thickness of the insulation layer 180 was about 2,000 Å (i.e., about 0.2 μm), and the size of the micro-slit pattern MS was about 5 μm. In comparing Example 1 to Example 2, the size of the control electrode 470 was greater than that of the pixel electrode 490, and the size of the micro-slit pattern MS was formed to about 4 μm.

In Example 3, in comparison to Example 1, the size of the micro-slit pattern MS was about 4 μm, and other conditions were substantially the same as those of Example 1.

Example 4 corresponds to the display panel of the second exemplary embodiment (as shown in FIG. 5) of the present invention. In Example 4, the thickness of the insulation layer 480 formed between the control electrode 470 and the pixel electrode 490 was formed to about 4 μm. Here, the sizes of the control electrode 470 and the pixel electrode 490 were substantially equal to each other, and the size of the micro-slit pattern MS was about 4 μm.

The following Table 1 represents transmittance data of the Comparative Examples and the Examples.

TABLE 1

|  | COMPARATIVE EXAMPLES | | EXAMPLES | | | |
| --- | --- | --- | --- | --- | --- | --- |
|  | 1 | 2 | 1 | 2 | 3 | 4 |
| ELECTRODE PART by INTERMEDIATE PORTION | 4μ by 4μm | 5 by 5 μm | 5 by 5 μm | 4 by 4 μm | 4 by 4 μm | 4 by 4 μm |
| SIZES OF CONTROL ELECTRODE (CE) AND PIXEL ELECTRODE (PE) | — | — | CE = PE | CE > PE | CE = PE | CE = PE |
| THICKNESS OF INSULATION LAYER | — | — | 0.2 μm | 0.2 μm | 0.2 μm | 4 μm |
| TRANSMITTANCE | 16.51% | 14.99% | 17.76% | 18.75% | 22.13% | 21.11% |

In comparing Comparative Example 1 to Comparative Example 2, the transmittance level was about 16.51% when the size of the micro-slit pattern was about 4 μm, and the transmittance level was about 14.99% when the size of the micro-slit pattern was about 5 μm. Thus, as the micro-slit pattern was decreased, transmittance was increased. Alternatively, in Example 1, the size of the micro-slit pattern was about 5 μm, the sizes of the control electrode and the pixel electrode were substantially equal to each other, and the thickness of the insulation layer was about 0.2 μm. Here, the transmittance level of Example 1 was about 17.76%, which was higher than that of Comparative Example 1 of which the micro-slit pattern was about 4 μm.

When Example 2 and Example 3 are compared with each other, the sizes of the control electrode and the pixel electrode were different from each other under conditions in which the micro-slit pattern was about 4 μm and the thickness of the insulation layer was about 0.2 μm. The size of the control electrode of Example 2 was substantially the same as that of the pixel electrode. Here, the transmittance level of Example 2 measured about 18.75%. The size of the control electrode of Example 3 was greater than that of the pixel electrode. Here, the transmittance level of Example 3 measured about 22.13%. That is, when the size of the control electrode was greater than that of the pixel electrode, the transmittance was increased. Alternatively, in Example 4, the micro-slit pattern was about 4 μm, the sizes of the control electrode and the pixel electrode were substantially equal to each other, and the insulation layer was about 4 μm. Here, the transmittance level of Example 4 was about 21.11%, which was higher than that of Comparative Examples 1 and 2.

As a result, the transmittance was enhanced as the size of the micro-slit pattern was decreased in the conventional structure; however, the transmittance of the conventional structure was lower than that of the cases in which the control electrode was formed in accordance with the Examples.

Therefore, the control electrode is formed in a pixel area of the TFT layer, so that the limitations of a technology process for finely forming the micro-slit pattern may be solved and the transmittance may be enhanced.

As described the above, a control electrode having an effective voltage difference is formed below a pixel electrode having a micro-slit pattern formed thereon, so that direction characteristics of liquid crystal molecules may be controlled to enhance transmittance.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display panel comprising:
an array substrate having a first thin film transistor (TFT), a control electrode and a pixel electrode disposed above the control electrode and including a micro-slit pattern;
an opposite substrate coupled to the array substrate and having a common electrode; and
a liquid crystal layer formed between the opposite substrate and the array substrate and arranged vertically when an electric voltage is not applied to the liquid crystal layer, and
wherein the control electrode substantially overlaps an entire portion of the pixel electrode in a plan view, and the pixel electrode is connected to the first TFT through a hole passing through the control electrode.

2. The display panel of claim 1, wherein the common electrode has a uniform thickness.

3. The display panel of claim 1, wherein the micro-slit pattern comprises an electrode part and an intermediate portion formed between electrode parts adjacent to each other, and wherein a width of the electrode part and a width of the intermediate portion each ranges from about 2 μm to about 10 μm.

4. The display panel of claim 3, wherein the widths of the electrode part and the intermediate portion are substantially equal.

5. The display panel of claim 1, wherein the array substrate further comprises a gate line and a data line, which are connected to the first TFT.

6. The display panel of claim 5, wherein the array substrate further comprises a storage line formed substantially parallel with the gate line.

7. The display panel of claim 6, further comprising a second TFT electrically connected to the gate line, a control line, and the control electrode.

8. The display panel of claim 7, wherein the control line is formed in a pixel area of a layer comprising the first and second TFTs.

9. The display panel of claim 6, wherein different effective voltages are applied to the pixel electrode and the control electrode.

10. The display panel of claim 1, wherein the control electrode is electrically disconnected from the pixel electrode.

11. A display panel comprising:
an array substrate comprising a switching element including a gate electrode, a source electrode, a drain electrode, a control electrode, a pixel electrode including a micro-slit pattern, and an insulation layer covering the source electrode and the drain electrode,
an opposite substrate coupled to the array substrate and having a common electrode; and
a liquid crystal layer formed between the opposite substrate and the array substrate, the liquid crystal layer being arranged vertically when an electric voltage is not applied to the liquid crystal layer,
wherein the control electrode substantially overlaps an entire portion of the pixel electrode in a plan view, and
wherein the control electrode is connected to the drain electrode, and the pixel electrode contacts the control electrode.

12. The display panel of claim 11, wherein the micro-slit pattern comprises an electrode part and a slit part formed between electrode parts adjacent to each other, and wherein a width of the electrode part and a width of the slit part each ranges from about 2 μm to about 10 μm.

13. The display panel of claim 12, wherein the widths of the electrode part and the slit part are substantially equal.

14. The display panel of claim 11, wherein the array substrate further comprises a gate line connected to the gate electrode and a data line connected to the source electrode.

15. The display panel of claim 14, wherein the array substrate further comprises a storage line formed substantially parallel with the gate line.

16. The display panel of claim 14, wherein the micro-slit pattern includes an electrode extending diagonally with respect to the gate line or the data line.

17. The display panel of claim 11, wherein the common electrode has a uniform thickness.

18. The display panel of claim 1, further comprising an insulating layer interposed between the control electrode and the pixel electrode.

19. The display panel of claim 1, wherein the micro-slit pattern includes a body having a cross shape and a plurality of branches extending from the body in different directions.

20. The display panel of claim 11, wherein the common electrode is formed continuously without patterning.

21. The display panel of claim 11, wherein the micro-slit pattern includes a body having a cross shape and a plurality of branches extending from the body in different directions.

22. The display panel of claim 1, wherein a size of the pixel electrode is substantially equal to a size of the control electrode from the plan view.

23. The display panel of claim 11, wherein a size of the pixel electrode is substantially equal to a size of the control electrode from the plan view.

* * * * *